Patented Jan. 13, 1925.

1,522,689

UNITED STATES PATENT OFFICE.

JOHN M. MACLACHLAN, OF MILWAUKEE, WISCONSIN.

PROCESS OF PRODUCING POWDERED MEAT.

Application filed April 23, 1923. Serial No. 633,884.

*To all whom it may concern:*

Be it known that I, JOHN M. MACLACHLAN, a citizen of the United States, residing at Milwaukee, in the county of Milwaukee and State of Wisconsin, have invented certain new and useful Improvements in Processes of Producing Powdered Meat; and I do hereby declare the following to be a full, clear, and exact description of the invention, such as will enable others skilled in the art to which it appertains to make and use the same.

This invention relates to the process of producing powdered meat. While many attempts have been made to prepare foods from meat, these prepared foods have generally been of such character that they have very small nutritive properties. Such foods includes beef extracts and beef juices. Such meat products contain a large percent of the salts found in the meat together with a large part of the extractives, a small quantity of fat and a very small proportion of soluble proteids. Experiments have proven that such preparations have very little food value and are only useful to a practical extent in stimulating the flow of the digestive secretions. Such products therefore are very ill fitted as food for sick or convalescing patients, as these products cannot be taken in sufficient quantities to supply the necessary nutrition. In order to secure the necessary nutritive substances in the meat product, it is necessary to retain therein the solid constituents of the meat. Ordinarily, meat contains about seventy-five percent of water and twenty-five percent of solids. Any successful attempts to obtain a nutritive matter of meat in a small bulk must, therefore, be based upon the removal of a part at least of the water which it contains. If all of the water were removed the composition of the solid product would be approximately of the following:

|  | Per cent. |
| --- | --- |
| Proteids and albuminoids | 86.8 |
| Extractives | 7.8 |
| Mineral matter | 5.4 |

Beef powders have actually been prepared by simply drying the meat and thus retaining all of such solid substances and such beef powders have been found to contain exceedingly high nutritive properties. The objection to such beef powders made from dried beef is that the original flavor of the meat has been entirely destroyed or changed by the drying process. It can readily be seen that meat could be dried on plates or otherwise and then ground into a powder but such a meat product has no commercial value owing to the fact that the beef aroma and flavor is entirely destroyed. It has been a great problem therefore with those who are working in this art to retain the original flavor of the meat.

Furthermore, it is desirable in a meat powder that the fiber of the meat be separated into very fine particles. It has been found that in the use of the dry powdered meats heretofore produced for hospitals for sick and convalescing patients, that when meat powder is used to make beef broth or tea, the particles of the meat tend to stick in the throat or that they at least give such a sensation and produce a sensation of roughness in the throat as though the meat contained grit. This tends to produce coughing and is otherwise objectionable so that such meat products have been criticized and objected to by physicians and dietitians in hospitals and similar places and have also found disfavor with the patients.

The process disclosed in this application is an improvement upon that disclosed in the joint application filed by John C. MacLachlan and applicant August 11, 1922, S. N. 581,056. In said process, the meat, after having been ground to fine condition was diluted with water and the mixture then pulped or ground exceedingly fine in a grinding or milling machine. It has been found that in such pulping or finely grinding the mixture, that heating often occurs and the flavor of the meat is adversely affected. The aroma and flavor of the meat is carried by and contained in the soluble extracts and it is the influence of the heat on these constituents of the meat which thus affect the flavor.

It is an object of this invention, therefore, to provide a process in which the fiber of the meat can be ground to a very fine condition and a meat powder produced which will retain the original flavor and aroma of the meat.

It is a further object of the invention to provide such a process in which the meat is first ground and then diluted so that the soluble particles are dissolved, after which the fiber is separated from the extractives. The fiber is then again diluted and pulped or ground very fine, after which the same is again mixed with the extractives and the mixture then dried.

These and other objects and advantages of the invention will be fully set forth in the following description made in connection with the accompanying drawings which illustrate diagrammatically one form of apparatus which can be used to carry out the herein described process.

Referring to the drawings.

Figure 1:
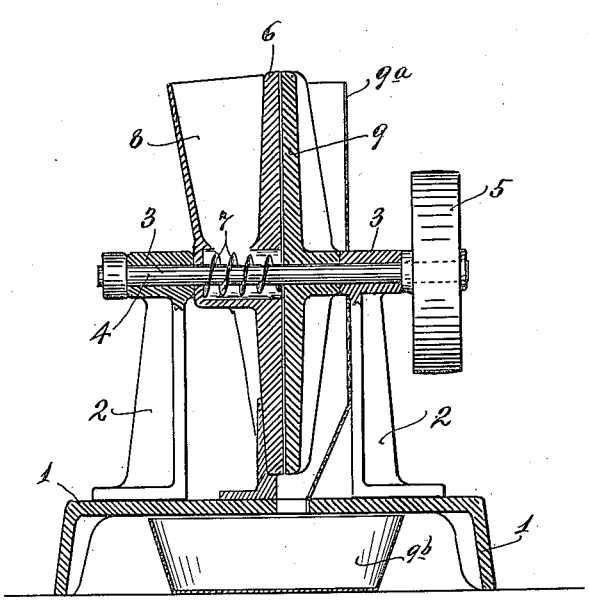
Fig. 1 represents more or less diagrammatically a vertical section of a grinding or milling machine used to disintegrate or pulp the mixture of water and meat.

In carrying out the process, the lean meat is first ground in an ordinary meat grinding or sausage machine to a finely ground condition. This condition of the meat is approximately that of meat usually used in making sausages of various kinds. Any well known form of meat grinding machine can be used in this step and it is thus unnecessary to illustrate any specific form of apparatus therefor. After the meat has thus been initially ground, it is mixed with water or other liquid to dilute the same to a fluid or semi-fluid consistency, so that the soluble portions or extractives will be dissolved. This mixture can be stirred, as desired, to insure that such solution will be complete. The mixture is then placed on a fine screen and some pressure may be applied thereto to press the juices and extractives which will contain the soluble parts of the meat through the screen and thus separate the same from the fibrous portions which will remain on the screen. Any common form of expressing device can be used in this step or the same can be performed by hand with the use of an ordinary sieve. After the fiber is thus separated from the soluble portions or extractives, the fiber is again diluted to a fluid consistency and the same is then delivered to a pulping or grinding machine where the same is milled or reduced to a very fine pulp. While any form of grinding machine of the milling type may be used, in practice, a grinding machine having vertical disks is used which is illustrated diagrammatically in Fig. 1 of the drawings. This machine comprises a frame having a base 1 carrying uprights 2 having thereon the bearings 3 in which is journaled the driving shaft 4 which may be driven from the pulley 5 thereon from any suitable source of power. The machine has a stationary disk 6 through the central opening of which the shaft 4 extends and is equipped with a screw conveyor 7 disposed in the bottom of the hopper 8. The shaft 4 is secured to and rotates disk 9 which moves in close proximity to the stationary disk 6, the adjacent faces of the disks being provided with suitable grinding flutes. The disks are enclosed in a suitable housing 9$^a$. The material is delivered to the hopper 8 and flows through the disk 6, being fed by the conveyor and thus passes between the disks which will be so adjusted that the material will be milled or ground to an exceedingly fine condition. The material will pass out at the edges of the disks and will be discharged through the bottom of the housing 9$^a$ at the bottom thereof and will be collected into a suitable receptacle 9$^b$. While one type of grinding machine has been illustrated, it will, of course, be understood that this fine grinding or pulping can be done in any suitable machine. While the grinding is being done, the material is kept as cool as possible but if some heating occurs it will have no objectionable effect upon the meat as the fiber is insoluble in itself and in a raw wet condition.

Figure 2:
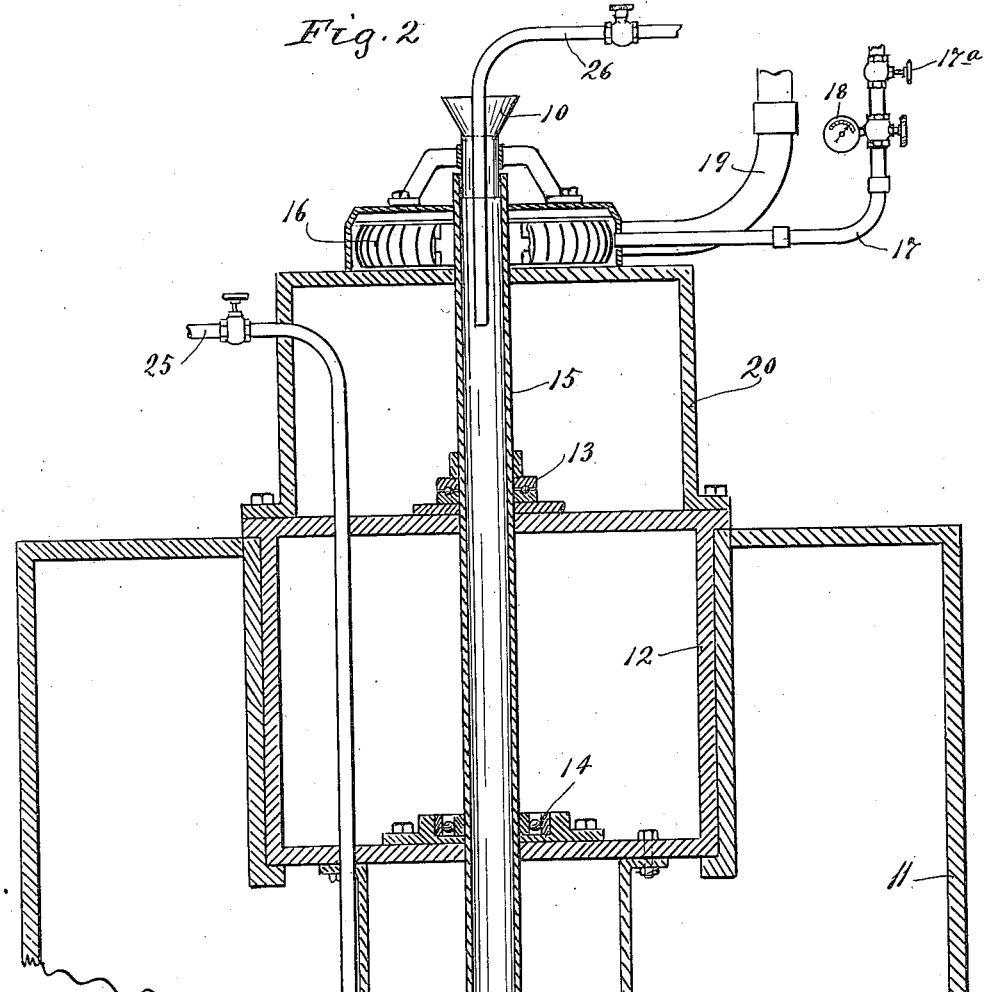
Fig. 2 represents a vertical section of a drying device used in the drying step.

The next step in the process consists in mixing the finely ground pulped fiber with the extractives which have previously been separated therefrom. This mixture is then ready to be dried and the same is transferred to the hopper 10 of a drying machine illustrated in Fig. 2. This apparatus comprises a drying chamber of considerable size having the walls 11 and in the top of which chamber is mounted a suitable bearing member 12. This member is provided with thrust and journal bearings 13 and 14, respectively, which are shown as of the ball type. In these bearings is mounted a rotating pipe or conduit 15, connected at its upper end to the rotor 16 of a steam turbine. This turbine is supplied with steam from a steam pipe 17 equipped with the usual regulating valve 17$^a$ and the gauge 18. The exhaust pipe for the turbine is shown as 19. The feeding hopper 10 of the drying apparatus is mounted on top of the turbine casing which is, in turn, mounted upon an auxiliary casing 20. At its lower end, the conduit 15 has rigidly secured thereto a downwardly flaring or conical member 21 having a plain lower edge. A distributing plate 22 is also secured to the extreme lower end of conduit 15 and has an upstanding conical member 23 disposed thereon and projecting into the lower end of said conduit to form a distributing means therefor. To the lower end of the member 12 a shell 24 is secured and depends with its lower edge in close proximity to the member 21, the said edge being turned outwardly slightly. A steam pipe 25 is disposed along the outside of the shell 24 and terminates in a ring surrounding said shell adjacent to its outwardly flaring end. This steam pipe is provided with a large number of perforations 25ª.

Figure 3:
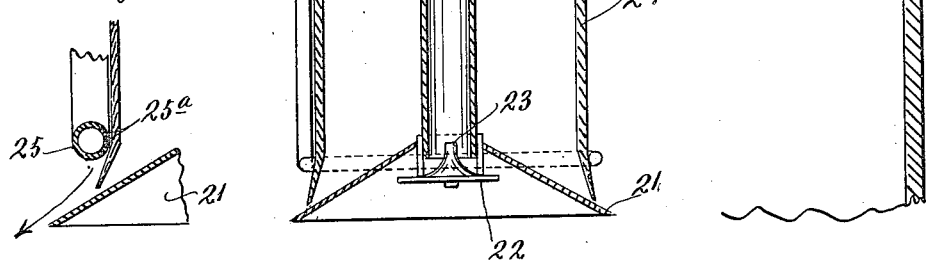
Fig. 3 is a view on an enlarged scale of a portion of the device shown in Fig. 2.

In the drying operation, the material is, as stated, charged into the member 10 and passes into the conduit 15. This conduit is revolved at exceedingly high speed by the turbine rotor 16. This turbine is of the De Laval or other high speed steam turbine type. It has been found that a steam turbine is a very efficient driving means for such a separating device, as the pressure of the steam can be maintained constant by the regulating valve 17ª and also by an automatic valve used in connection with the gauge 18. With a constant pressure, the speed of the turbine is substantially constant and maintained at a large number of revolutions per minute. The fluctuations in speed of electric motors due to variations in the current is thus avoided. The material passes down the conduit 15 and is distributed onto plate 22 by the member 23 and from this plate, is thrown outward again to the inner walls of the flaring member 21. The material is distributed on and moves to the bottom of the member 21 and is projected outwardly in an umbrella-like shower at high velocity. The steam entering pipe 25 issues from the perforations 25ª at high velocity and is deflected, as shown by the arrows in Fig. 3, downwardly around the edge of member 21. This steam acts to impact and separate the particles of the pulp and at the same time to dry the same. A circulation of warm or hot air is maintained in the drying chamber and the material projected outwardly by the drying apparatus is dried almost simultaneously and falls to the bottom of the chamber in the form of a dry and very fine powder.

In practice it has been found that the high speed of rotation of the tube 15 tends to cause a back pressure therein and to interfere with the free movement of the material downward therethrough. For this reason, a pipe 26 is provided extending some distance down into the tube 15. This pipe is connected by a suitable source of steam supply and a jet of steam is discharged outward into the tube 15 to cause the material to continuously and uniformly move therethrough.

While specific apparatus has been illustrated by which the process can be carried out, it will be understood that the same may be practiced by the use of various forms of apparatus, that illustrated being merely one of such forms.

During the drying operation, the liquids will be evaporated from the soluble substances and the same will be deposited with the other pulverized parts of the meat at the bottom of the chamber 11. The particles of the pulverized fiber and other insoluble substances will be separate from the particles of the soluble substances but all of these particles will be deposited together and mixed to form homogeneous dry powdered material. The soluble particles will be still in a soluble and uncooked condition and the flavoring qualities of these particles will be unimpaired. When the pulverized meat is used to make a broth or tea, all of the original flavor of the meat will be retained and the taste and flavor of the same will be as though made from the fresh meat.

The product thus formed has been found very satisfactory in preparing broths and tea for invalids and convalescing patients and produces none of the disagreeable effects which have been experienced by powdered meats prepared by previous processes. Furthermore, the broth or tea made from the powdered meat will have the same aroma and flavor as if the same had been made from perfectly fresh meat. The product is also of great value for making dressings, for meat gravies, etc., for household use.

The particles of meat while in transit in the chamber are heated sufficiently to be sterilized so that any tendency of the meat to become sour or rancid is eliminated. This dry heating is not sufficient, however, to change or impair the flavor of the meat substances.

It will, of course, be understood, that various changes may be made in the duration and sequence of the various steps of the process without departing from the scope of applicant's invention, which, generally stated, consists in a process capable of attaining the objects above enumerated, and such as herein disclosed and defined in the appended claims.

What is claimed is:

1. The process of producing dry powdered meat which consists in grinding the meat to a fine condition, diluting the ground meat to bring the extractives into solution, separating the fiber from the extractives, diluting the separated fiber and disintegrating the same to a fine pulp, mixing this pulp with the extractives and then drying the resulting mixture substantially instantaneously to a powdered form.

2. The process of producing powdered meat, which consists in grinding the meat, mixing the ground meat with water to form a fluid, separating the fibrous part of the mixture from the juices thereof, diluting the separated fiber and pulping the same to disintegrate the fiber of the meat, then again mixing the disintegrated fiber and the separated juices and then separating and rapidly drying the separated particles of the mixture to form a powdered substance.

3. The process of producing powdered meat which consists in grinding the meat, mixing the same with water to form a fluid to dissolve the extractives, separating the fiber of the meat from the soluble extractives and liquid, diluting the separated fiber and pulping the same to a very fine condition, again mixing the pulped fiber and the extractives and liquids and then rapidly drying the resulting mixture by projecting the same in a spray in the presence of a hot drying medium to separate the particles thereof and dry the same.

4. The process of producing dry powdered meat which consists in grinding the meat to a fine condition, diluting the same to a fluid consistency, separating the fibrous portion of the meat from the liquid portion which contains the extractives, again diluting the fiber and disintegrating the same to a fine pulp, mixing said pulp with the separated liquid and extractives, projecting the resulting mixture in a spray in the presence of a hot drying medium, and projecting a blast of steam through said spray to separate and rapidly dry the particles thereof.

In testimony whereof I affix my signature.

JOHN M. MACLACHLAN.